May 19, 1942.  J. H. BUCKNAM ET AL  2,283,346
BLOWPIPE MACHINE
Filed April 26, 1940  2 Sheets-Sheet 1
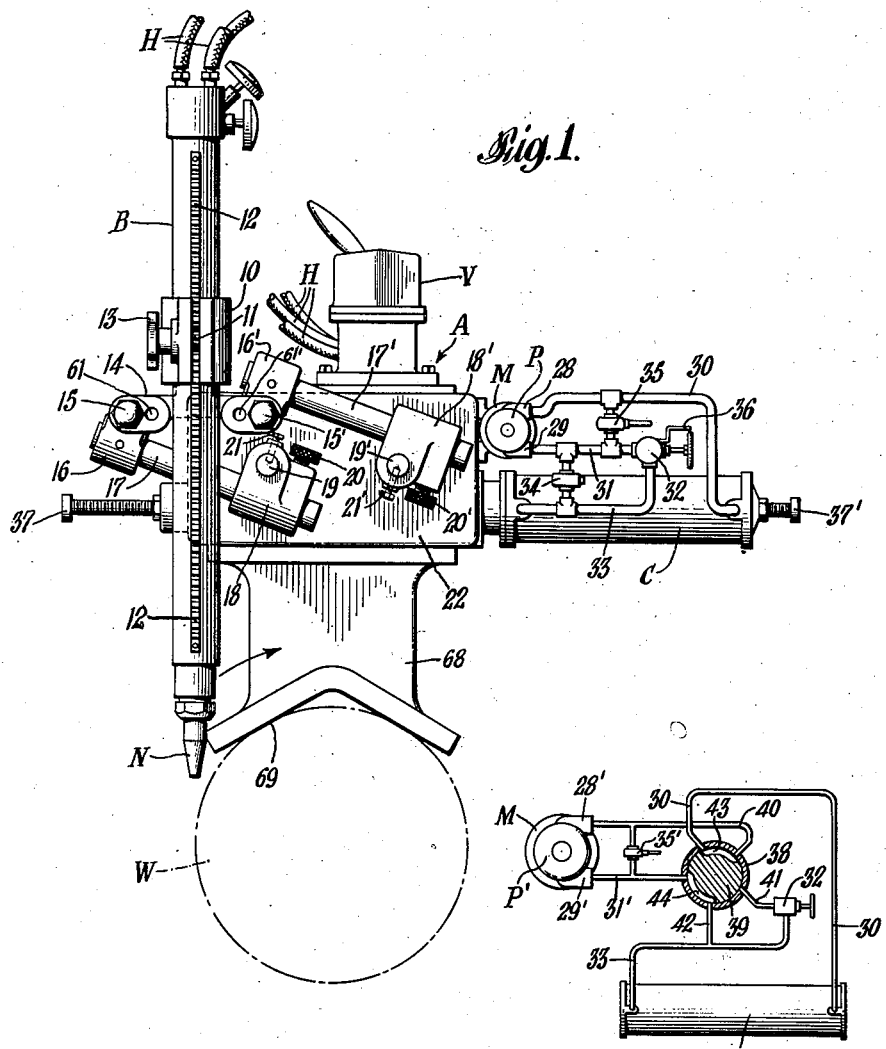
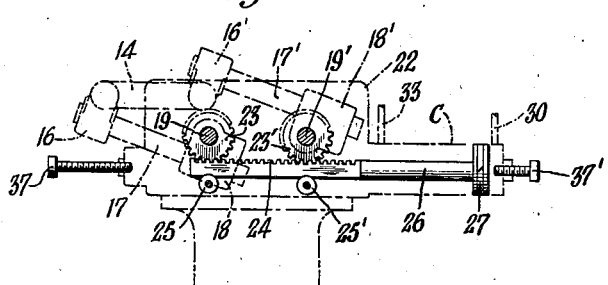
INVENTORS
JAMES H. BUCKNAM
LLOYD W. YOUNG
BY
ATTORNEY May 19, 1942. J. H. BUCKNAM ET AL 2,283,346
BLOWPIPE MACHINE
Filed April 26, 1940 2 Sheets-Sheet 2
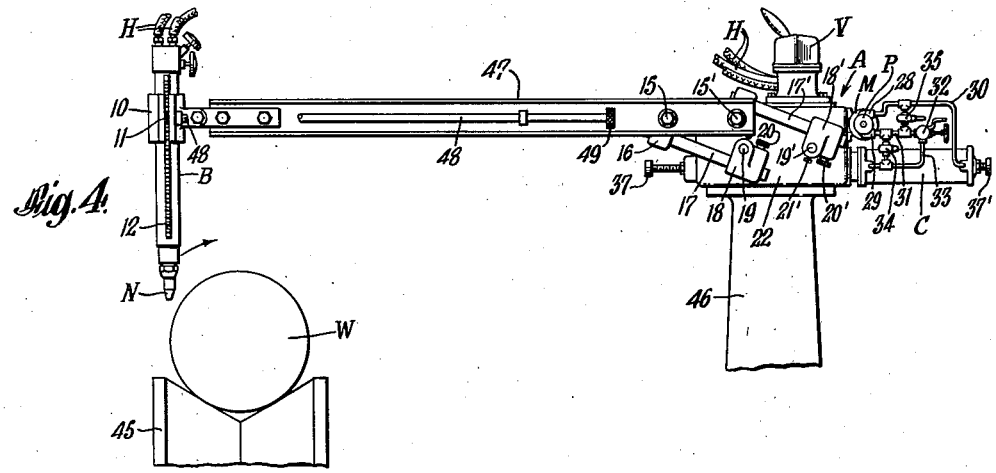
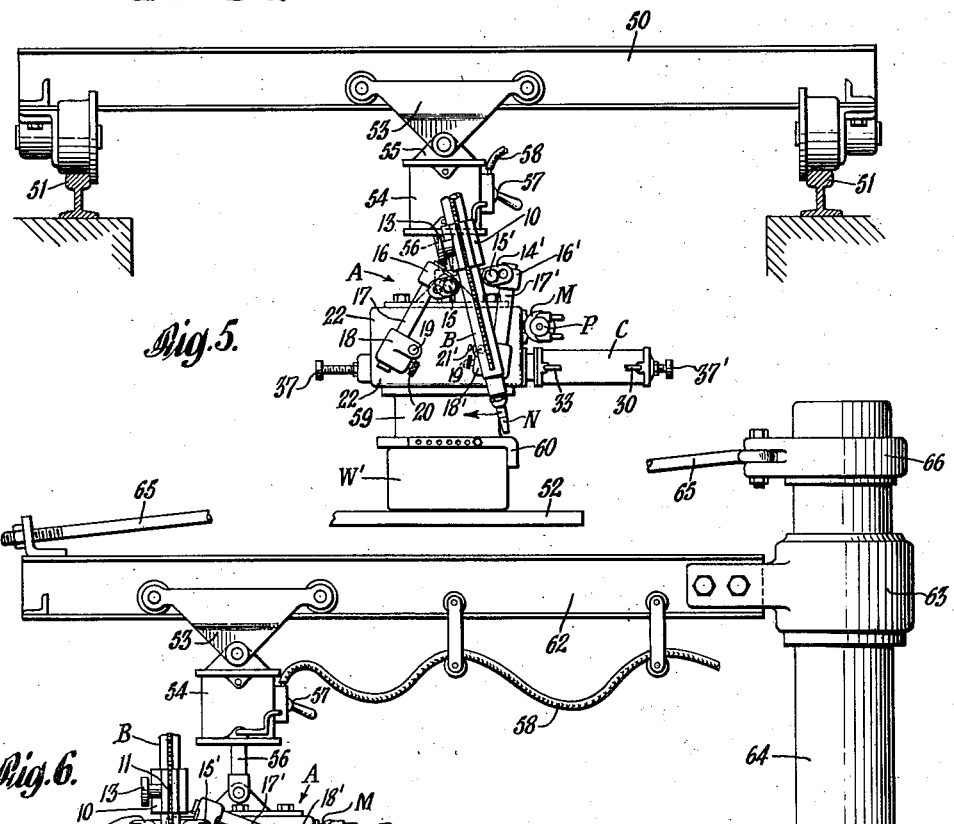
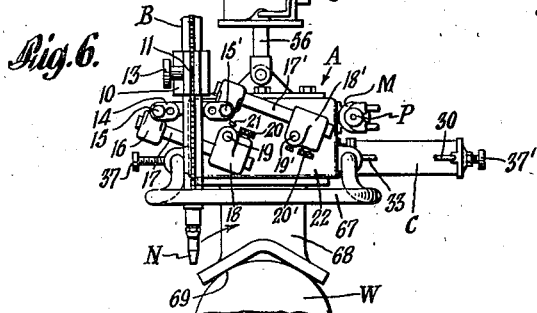
INVENTORS
JAMES H. BUCKNAM
LLOYD W. YOUNG
BY
ATTORNEY Patented May 19, 1942

2,283,346

UNITED STATES PATENT OFFICE 2,283,346

BLOWPIPE MACHINE

James H. Bucknam, Cranford, and Lloyd W. Young, Scotch Plains, N. J., assignors to Oxweld Acetylene Company, a corporation of West Virginia Application April 26, 1940, Serial No. 331,694

15 Claims. (Cl. 266—23)

This invention relates to blowpipe machines, and more particularly to a machine for thermochemically cutting ferrous metal bodies such as steel bars and billets of various sizes and shapes.

Steel bars and billets have previously been cut by blowpipe machines which move an oxidizing gas jet transversely of the bar being cut at a suitable cutting speed. Such machines, however, were specially constructed for cutting bars of a particular shape and a machine for cutting round stock was not suitable for cutting rectangular stock and vice versa. It was necessary to provide a special machine for each commercial application which has resulted in greater expense and limited the use of this method of cutting bar stock.

The gas-cutting blowpipe has been found advantageous for cutting billets in steel mills particularly when it is desired to cut off defective ends or to cut the billets into desired lengths between rolling stages and after they have been inspected. Such billets are usually of various sizes and may be either round or rectangular according to the type of product the mill is rolling at any particular time. It is, therefore, desirable that the cutting device should be quickly adjustable for efficiently cutting a variety of sizes and shapes and also quickly adjustable or mountable with respect to billets at various locations in a given area.

It is a principal object of the present invention to provide an improved machine for thermochemically severing ferrous metal bodies such as steel bars and billets.

Other objects of the invention are to provide an improved mechanism for moving a cutting blowpipe with respect to a metal body to be cut or operated on, which mechanism is readily adaptable to various sizes and types of metal bodies and which is adjustable to operate under various conditions; to provide such a mechanism which is quickly adjustable to operate on round or on rectangular bars and which is also readily adjustable to accommodate a substantial range of different diameters and widths of bars; to provide a mechanism for cutting metal bars or billets with a gas-cutting blowpipe which may be installed adjacent a conveyor line that carries such bars and billets; to provide such mechanism which is adapted to be quickly transferred from one body or billet to be cut to another billet when such billets are adjacent each other or are placed at random on a floor or cooling bed; which is adapted to sever such billets while they are hot; which enables the operator to direct the cutting operation at a comfortable distance from such hot bars; and to provide such a mechanism which is relatively light, simple, and economical to manufacture.

The manner in which this invention attains these and other objects will be apparent from the following description and accompanying drawings in which:

Fig. 1 is an elevational view of a preferred form of blowpipe mechanism according to the invention;

Fig. 2 is a diagrammatic representation of the crank-driving mechanism in the machine;

Fig. 3 is a diagrammatic representation of an alternative arrangement of the hydraulic driving circuit employing a direction changing valve;

Fig. 4 is an elevational view of a modified form of the mechanism arranged for cutting round billets supported on a conveyor;

Fig. 5 is another arrangement of means supporting the blowpipe mechanism for cutting rectangular billets; and Fig. 6 is still another arrangement of mechanism for supporting and moving the blowpipe mechanism so that it may be mounted on various billets on a floor.

Referring to Fig. 1 the blowpipe is shown at B and has at its lower end a cutting nozzle N. This blowpipe and nozzle may be of the customary construction for producing a cutting jet surrounded by a series of heating flames. The blowpipe is supplied with oxidizing gas and fuel gas through flexible conduits or hoses H connected to its upper end in the customary manner. The blowpipe B is supported by a holder 10 in which the blowpipe is vertically slidable. In the holder is a pinion 11 which meshes with a rack 12 secured along the front of the blowpipe. The pinion 11 is turnable by a handwheel 13 for adjusting the height of the blowpipe nozzle N with respect to the work W which may be a cylindrical bar, as indicated by the broken lines. The holder 10 is centrally secured to the front side of a horizontal link 14, the end portions of which are journaled on forwardly extending crank pins 15 and 15'. The crank pins 15 and 15' are secured to crank pin blocks 16 and 16', respectively, so that the pins are parallel to each other and to the main axis of the work. The pin blocks 16 and 16' are secured at the ends of a pair of oscillatable crank arms 17 and 17', respectively, which are longitudinally adjustable in crank blocks 18 and 18'. The crank blocks 18 and 18' are secured to the forwardly extending ends of two crank shafts 19 and 19'. The crank shafts 19 and 19' are parallel to the crank pins 15 and 15' and to the main axis of the work W. The crank shafts 19 and 19' are also horizontally at the same level and are spaced apart a distance which is the same as the distance between the crank pins 15 and 15'. The crank arms 17 and 17' are offset to one side of the crank shafts 19 and 19' in order to provide adequate clearance for adjustment of the distance between the crank pins and the crank shafts through a relatively wide range.

To maintain the desired adjustment of the active length of the crank arms, there are provided set screws 20 and 20' which are threaded in the blocks 18 and 18', respectively, and the ends of which engage notches or drilled holes in the crank arms 17 and 17'. The crank block 18' may be fixedly secured to the crank shaft 19'. However, in some instances as will be explained hereinafter, it may be desirable to permit the relative rotational movement between one of the blocks 18 or 18' and the respective crank shaft. The blocks 18 and 18' are, therefore, rotatably secured to the ends of the crank shafts and to lock the blocks to the crank shafts there are provided set screws 21 and 21', the ends of which engage depressions in the crank shafts 19 and 19'. The crank shafts 19 and 19' are journaled in bearings secured in the front and back walls of a rectangular box-like gear housing 22.

The arrangement of the crank-shaft driving mechanism is diagrammatically illustrated in Fig. 2 and comprises a pair of spur gears 23 and 23' of equal pitch and diameter which are keyed to the shafts 19 and 19', respectively. A rack 24 is disposed immediately under the gears 23 and 23' and arranged to mesh with both gears so that by horizontally moving the rack the crank shafts 19 and 19' will be simultaneously rotated in the same direction. To maintain close meshing of the rack 24 with gears 23 and 23' and allow free horizontal movement of the rack, two rollers 25 and 25' are journalled in projections extending upwardly from the bottom of the housing 22. The rollers 25 and 25' engage and support the lower edge of the rack 24. The right-hand end of the rack 24 is secured to a piston rod 26 which is secured to the piston 27 of a hydraulic cylinder C. The rod end of the cylinder C is secured against and supported on the right-hand end of the housing 22, projecting horizontally therefrom.

Any suitable means for supplying fluid to the rod and head ends of the cylinder C may be employed. For example, liquid under pressure may be supplied from an external source to either end so as to move the piston and thereby move the blowpipe at the desired rate in either direction. A preferred arrangement for circulating a driving fluid, such as oil, is illustrated in the drawings. Such circulating means comprises a reversible electric motor M secured against the end of the housing 22 above the cylinder C and a rotary pump P directly coupled to the motor M, and supported on the frame of the motor. The pump P is preferably of a positive displacement reversible type such as a gear pump and is provided with two fluid connections 28 and 29 either of which may serve as a fluid outlet, according to the direction of rotation of the motor. Connection 28 is preferably placed in communication with the head end of the cylinder C by a conduit 30. Connection 29 is placed in communication with the rod end of cylinder C through a conduit 31, a needle valve 32, and a conduit 33. There is also provided a by-pass around the valve 32 connecting conduits 31 and 33 and controlled by a check valve 34. The check valve 34 is arranged to provide free flow of fluid from conduit 33 to inlet 29 and to prevent flow therethrough in the other direction. Another by-pass is arranged to connect conduit 31 with conduit 30 and is controlled by a back-pressure valve 35. The back-pressure valve 35 is arranged to pass liquid in either direction between conduits 30 and 31 and may comprise a customary type of back-pressure valve which may have therein a poppet type of valve element which is urged toward its seat by a spring, and lifted from its seat by a pressure responsive element and arranged so that the force of the spring may be adjusted as desired to cause the valve to open against the force of the spring only when the pressure on either side of the valve exceeds the set valve pressure, which value is sufficient to maintain a differential of pressure between conduits 30 and 31 that will move the piston 27 in the cylinder C with a suitable force. When the motor M is driven in the proper direction to cause oil to flow out through connection 28, the oil will freely circulate through the system in a clockwise direction through conduit 30 into the head end of the cylinder C, thus driving the piston 27 to the left at a relatively rapid rate. The oil on the rod side of the piston 27 will flow out through conduit 33 and through valves 32 and 34 to connection 29, thus completing the circuit. When the motor M is reversed, oil will be forced out connection 29 into conduit 31. Valve 34 will remain closed to prevent flow therethrough and valve 32 will restrict the flow so that oil will flow to conduit 33 at a relatively slow rate determined by the setting of the valve 32 which may be recorded by an index 36. When the pressure in conduit 31 overcomes the valve 35, the oil that is pumped in excess of that passing valve 32 will flow through valve 35 to connection 28. The rate of movement of piston 27 is thus readily adjustable to move the nozzle N at a desired uniform cutting speed and a simple reversal of the motor M provides a quick return of the nozzle N to a starting position for beginning another cut.

It will usually be desirable to limit the movement of the blowpipe in either direction so that the blowpipe nozzle can be positioned accurately with respect to the starting end of the kerf to be made. To this end there is provided a pair of adjustable stop screws 37 and 37' axially in line with the rack 24, rod 26, and piston 27. The screw 37 is threadedly supported in the end wall of the housing 22 and limits motion of the blowpipe to the right by engaging the left end of the rack 24 and the screw 37' is threaded through the head of the cylinder C to engage the piston 27 and limit movement of the blowpipe to the left.

In some instances it may be desired to supply the driving fluid from a source in a constant direction such as by a constant direction pump P'. A suitable alternative arrangement is illustrated diagrammatically by Fig. 3. The pump P' is driven at a constant speed and direction so that the fluid enters at 29' and is discharged at 28'. A five-way valve 38 is provided to reverse the direction of flow in conduits 30 and 33. The valve has five ports controlled by a rotary valve element or plug 39. The conduit 31' connects one port to the pump inlet 29'. The next port in a clockwise direction communicates with conduit 30. The third port communicates through a conduit 40 with the fluid outlet 28'. The fourth port connects by a conduit 41 with the flow adjusting valve 32. The fifth port communicates through a connection 42 with the conduit 33. A unidirectional back-pressure valve 35' is connected between the pump inlet and outlet conduits 31' and 40. When the valve element 39 is in the counterclockwise position shown, the fluid discharged at 28' flows through conduit 40, through the valve passage 43 of the valve element 39 to the conduit 30 and from the conduit 33 through connection 42 and a passage 44 of the valve element to conduit 31' and inlet 29'. This drives the piston 27 rapidly to the left, moving the blowpipe to the right. To reverse the movement, the valve element 39 is moved clockwise about ⅕ of a turn to cause the passage 44 to connect conduit 31' with conduit 30 and the passage 43 to connect conduit 40 with conduit 41. Connection 42 will be blanked off. The flow will then be from outlet 28' through conduit 40, connection 43, conduit 41, valve 32, and conduit 33 to the rod end of the cylinder, and from conduit 30, connection 44, conduit 31', to inlet 29'. The piston will then move to the right at a speed controlled by valve 32 and any excess fluid pumped will be by-passed by back-pressure valve 35' which may be of a more simple form since the flow therethrough will always be in the direction from conduit 31' to conduit 40. A two directional back-pressure valve 35 is desirable in the form of apparatus in Fig. 1 because the pump will then not be stalled when the piston reaches either limit of travel.

Referring to Fig. 4, the work W is shown supported upon rollers 45 of a conveyor. At one side of the line of conveyor rollers 45, the blowpipe-driving mechanism A is mounted at a suitable height on a column 46 which may be disposed at a sufficient distance from the conveyor line so that the heat of a hot billet will not adversely affect the mechanism A and so that an operator may operate the apparatus from a position adjacent the mechanism A. In place of the link 14 there is substituted an extended arm 47 which is journaled adjacent its right-hand end to the crank pins 15 and 15' and which carries at its other end the cutting blowpipe B, the blowpipe holder 10 being preferably adjustably secured to the end of the arm 47. To conveniently adjust the height of the nozzle N, the pinion 11 in the holder 10, is connected to an elongated operating rod 48 which extends parallel to the arm 47 and has an operating handle 49 near the mechanism A. The gas conduits H leading to the upper end of the blowpipe B are also preferably provided with control valves V located adjacent the mechanism A.

To operate this embodiment according to the invention for cutting a hot bar W, the operator will throw a reversing switch to rotate the motor and pump P in the direction for quickly moving the arm 47 to the right. By turning handle 49, the operator may then adjust the height of the nozzle N. Previous to this, the length of the crank arms 17 and 17' will have been adjusted to equal the radius of the bar W plus about ¼ inch which represents the desired spacing of the nozzle from the work surface. The operator will then open the valves V which control the preheating gas-supply conduits and the preheating gases will ignite upon issuing from the nozzle N due to the heat of the billet W. The heating flames will raise a spot on the surface of the work W to an ignition temperature and then the operator will turn on the oxidizing gas with valve V and throw the switch of the motor M to rotate the pump in the direction that will force oil at the regulated rate into the rod end of the cylinder C, thus driving the nozzle N transversely across the work W in a path parallel to the work surface and at the proper cutting speed. When the nozzle reaches the far edge of the work and the billet is completely severed, the operator will shut off the gases and throw the motor switch to cause the blowpipe B to be returned to the starting position at a relatively high speed in preparation for making another cut.

An alternative form of mechanism for supporting the blowpipe-moving mechanism A is illustrated in Fig. 5 which shows a carriage 50 similar to that of an overhead crane which is mounted to travel along rails 51 supported on suitable foundation and arranged parallel to the longitudinal axis of the work W'. The work W' may be a rectangular billet supported anywhere between rails 51 on a floor preferably on transverse bars 52. The carriage 50 carries a hanger 53 which is transversely movable along a transverse beam of the carriage 50. The blowpipe mechanism A is suspended from the hanger 53 by a power cylinder 54 which has its head end 55 pivotally connected to the hanger 53 and its piston rod 56 pivotally secured to the top of the gear box 22. The cylinder 54 is preferably controlled by an air valve 57 which receives a supply of air from an external source through a hose 58 and which allows the passage of such compressed air into the rod end of the cylinder when the valve 57 is in the upper position. When the handle of valve 57 is in the lower position, the air will be released from the rod end of the cylinder 54 which will allow the mechanism A to be lowered into contact with the top of the work W'. For cutting a rectangular bar, the blowpipe mechanism A is provided with a base 59 which has a flange 60 at one side for contacting the edge of the work W' when the mechanism A is accurately centered over the work. The position of the flange 60 is adjustable with respect to the base 59 so that it may be adjusted for use on a wide variety of widths of work.

For properly moving the blowpipe B with respect to the rectangular bar W', the crank pins 15 and 15' are journaled in holes in the link 14' which are closer together by a definite amount than the center to center distance of the crank shafts 19 and 19'; such holes are shown at 61 and 61' in Fig. 1. By providing this closer spacing and by providing the correct height of base 59 and length of blowpipe B, the end of the nozzle N will be caused to move in a substantially straight horizontal path at a substantially uniform distance from the surface of the work W' when the crank shafts 19 and 19' are rotated. When cutting square bars it will be necessary to loosen one of the set screws 21 or 21' to allow one of the crank arms 17 or 17' to move at a slightly different rate than the other crank arm. The principles of the crank and link arrangement for cutting rectangular bars are more fully described in the copending application of L. W. Young, Serial No. 331,693.

To operate the mechanism as illustrated in Fig. 5, it will be assumed that the blowpipe mechanism is adjusted for cutting rectangular bars, that the length of the crank arms 17 and 17' is adjusted, according to the width of the bar W' to be cut, that the flange 60 is positioned on the base 59 according to the width of the work W', and that the nozzle N is in its rightward position. The operator will lift valve 57 allowing air to enter the rod end of cylinder 54 and raise the mechanism A. The mechanism may then be pushed laterally so that the hanger 53 will roll along the carriage 50 until the mechanism A is properly positioned over the billet W'. The operator will then lower the handle of valve 57 to lower the base 59 onto the work W'. The operator after adjusting the position of the nozzle N with respect to the edge of the work W' will turn on the preheating gases which may be ignited by, for example, a pilot flame or by striking an electric spark. When the corner is sufficiently heated, the operator will turn on the oxidizing gas and energize the motor M to turn the pump P in the proper direction for moving the blowpipe to the left at cutting speed. When the bar W' is completely severed the gases may be shut off, the motor M or fluid flow reversed to return the nozzle to a starting position, and the handle of valve 57 lifted to raise the mechanism A so that it can be moved over another billet to be cut. The bar will be completely severed by reason of the angular position of the blowpipe at the finishing end of the cut as explained in the aforementioned copending application.

Referring to Fig. 6 there is shown still another arrangement of apparatus for supporting the blowpipe mechanism A. The hanger 53 is arranged to roll along a boom 62 which is secured at one end to a collar 63 rotatably secured to a column or mast 64. A tie rod 65 is secured to the outer end of the boom 62 and to another collar 66 on the mast above the collar 63. In this form of the apparatus the housing 22 carries a hand rail 67 which encircles the complete path of movement of the blowpipe B and forms a guard to prevent injury to the blowpipe as well as a convenient grip for moving the mechanism A. The mechanism A is provided with a base 68 having a V-shaped bottom surface 69 adapted to contact with a cylindrical bar W and accurately center the mechanism A on such bar.

The operation of this form of the apparatus will be obvious from the description of the operation of the previously described form of apparatus. Since, however, the mechanism A is swingable with respect to the cylinder 54 about a vertical center line, since the boom 62 is swingable about the mast 64, and since the mechanism A is movable to any desired position along the boom 62, it will be evident that the mechanism A can readily be mounted on any bar W that is supported on the floor in any position within the circle swept by the boom 62.

Features of the apparatus shown in Fig. 5 and of the apparatus shown in Fig. 6 are claimed in divisional application Serial No. 406,950, filed August 15, 1941, for "Blowpipe machine."

The particular embodiments of the invention described herein and illustrated in the accompany drawings, are presented to indicate how the principles of the invention may be applied. Other forms, differing in detail but not in principle, will of course suggest themselves to those skilled in the art.

We claim:

1. Blowpipe apparatus adjustable for cutting work of any desired cross-sectional shape, which comprises a cutting blowpipe having a nozzle; a holder for said blowpipe; mechanism for supporting and moving said holder to move said blowpipe in a fixed plane extending transversely of the work to be cut while moving said nozzle in a path which substantially follows the contour of the work surface; said mechanism comprising a pair of crank arms swingable about parallel axes; a link connecting said crank arms and carrying said holder, the length of said link being adjustable to change the angular relation between said crank arms; gears of equal diameter operatively connectible with each crank arm; a rack meshing with both of said gears; and means for reciprocating said rack for moving said nozzle in said path; the arrangement being such that, when said link is adjusted so that its length is equal to the distance between said axes and both of said gears are operatively connected to said crank arms, movement of said rack causes the mechanism to move said nozzle in an arcuate path to follow an arcuate work surface, and, when said link is adjusted so that its length is less than the distance between said axes and only one of said gears is connected to its crank arm, movement of said rack causes the mechanism to move said nozzle in a flat path to follow a flat work surface.

2. Blowpipe apparatus according to claim 1 in which said means for reciprocating said rack comprises a cylinder, a piston in said cylinder operatively connected with said rack, means for supplying operating fluid at a regulated relatively slow rate to said cylinder on one side of said piston to move said mechanism and the blowpipe in one direction for cutting work, and means for supplying operating fluid to said cylinder on the other side of said piston at a relatively fast rate to effect a relatively quick return movement of said blow pipe.

3. Blowpipe apparatus according to claim 1 in which said means for reciprocating said rack comprises a cylinder, a piston in said cylinder operatively connected with said rack; and means for moving said piston in either direction comprising a closed hydraulic system including a pump, a motor connected to drive said pump, and passage means connecting said pump with said cylinder at both sides of said piston.

4. Blowpipe apparatus according to claim 1 in which said means for reciprocating said rack comprises a cylinder, a piston in said cylinder operatively connected with said rack; means for supplying an operating fluid under pressure; means for receiving used operating fluid; and valve means operable to connect said fluid-supply means with said cylinder on either side of said piston and simultaneously to connect the portion of said cylinder on the opposite side of the piston with said fluid receiving means, whereby in one position of said valve means the piston and blowpipe will be moved in one direction and in the other position of said valve means the piston and blowpipe will be moved in the opposite direction for cutting work.

5. Blowpipe apparatus according to claim 1 in which said means for reciprocating said rack comprises a piston, a pump for operating said piston, and a motor for driving said pump, said motor and pump being reversible and arranged so that the piston, mechanism, and blowpipe are movable in either direction desired according to the direction of movement of said motor and pump.

6. Blowpipe apparatus according to claim 1 in which said means for reciprocating said rack comprises a motor, hydraulic means including a pump connected to said motor, a cylinder, a piston connected to said rack, and hydraulic passage means connected between said pump and said cylinder, said motor and pump being reversible and said passage means having interposed therein valve means for controllably restricting the rate of flow in one direction, whereby said blowpipe is movable relatively fast in the one direction and relatively slower in the opposite direction.

7. Blowpipe apparatus according to claim 1 in which said means for reciprocating said rack comprises a motor, hydraulic means including a pump connected to said motor, a cylinder, a piston connected to said rack, and hydraulic passage means connected between said pump and said cylinder, said motor and pump operating in a constant direction and said passage means having valve means therein operable to connect the outlet of said pump alternately with either end portion of said cylinder and simultaneously to connect the opposite end portion of said cylinder with the inlet of said pump.

8. Blowpipe apparatus adjustable for cutting work of any desired cross-sectional shape which apparatus comprises a cutting blowpipe having a nozzle; a holder for said blowpipe; mechanism for supporting and moving said holder to move said blowpipe in a fixed plane extending transversely of the work to be cut while moving said nozzle in a path which substantially follows the contour of the work surface, said mechanism comprising a pair of crank arms swingable about parallel axes, a link connecting said crank arms and carrying said holder, the operative length of said link being adjustable to change the angular relation between said crank arms, the arrangement being such that when said link is adjusted so that its operative length is equal to the distance between said axes, oscillation of said crank arms moves said nozzle in an arcuate path for traversing an arcuate work surface, and when said link is adjusted so that its operative length is less than the distance between said axes, oscillation of said crank arms moves said nozzle in a substantially straight path for traversing a flat work surface; and mechanism for oscillating said crank arms comprising a cylinder with a piston reciprocal therein, means connecting said piston to at least one of said crank arms for transmitting reciprocal movements of said piston to such arm to oscillate said crank arms, and means for supplying an operating fluid at a desired rate to said cylinder on either side of said piston.

9. Blowpipe apparatus adjustable for cutting work of any desired cross-sectional shape which comprises a cutting blowpipe having a nozzle; a holder for said blowpipe; mechanism for supporting and moving said holder to move said blowpipe in a fixed plane extending transversely of the work to be cut while moving said nozzle in a path which substantially follows the contour of the work surface, said mechanism comprising a pair of crank arms swingable about parallel axes, a link connecting said crank arms and carrying said holder, the operative length of said link being adjustable to change the angular relation between said crank arms, the arrangement being such that when said link is adjusted so that its operative length is equal to the distance between said axes, oscillation of said crank arms moves said nozzle in an arcuate path for traversing an arcuate work surface, and when said link is adjusted so that its operative length is less than the distance between said axes, oscillation of said crank arms moves said nozzle in a substantially straight path for traversing a flat work surface; and mechanism for oscillating said crank arms comprising a gear operatively connected to one of said crank arms, a rack meshing with said gear, a cylinder with a piston therein connected to reciprocate said rack, means for supplying an operating fluid to said cylinder on either side of said piston to reciprocate said piston, and means for regulating the rate of movement of the blowpipe in one direction to a relatively low uniform rate for moving said blowpipe at a desired cutting speed and for regulating the rate of movement of the blowpipe in the other direction to a relatively high rate for effecting a quick return movement of said blowpipe.

10. Blowpipe apparatus for cutting hot bars and the like, which comprises a frame mounted in spaced operative relation to and at one side of a substantially horizontal bar to be cut; a pair of crank arms swingable in a substantially vertical plane about parallel substantially horizontal axes on said frame; a substantially horizontal link connecting said crank arms and having a portion extending beyond the crank arms toward said bar, said portion being positioned above and transversely with respect to said bar; a cutting blowpipe; and a holder for said blowpipe secured to said portion for supporting said blowpipe in an operative position with respect to said bar; said link and said crank arms being arranged so that said blowpipe will move parallel to itself in a substantially vertical plane transversely of the bar and in an arcuate path substantially equi-distant from the surface of said bar when said crank arms are moved through arcs.

11. Blowpipe apparatus for cutting hot bars and the like, which comprises a frame mounted in spaced operative relation to and at one side of a horizontal bar to be cut; said frame being substantially stationary with respect to said bar during the cutting operation; a pair of crank arms swingable in a vertical plane about parallel horizontal axes on said frame; a horizontal link connecting said crank arms and having a portion extending beyond the crank arms toward said bar; said portion being positioned above and transversely with respect to said bar; a cutting blowpipe; a holder for said blowpipe secured to said portion of said link for supporting said blowpipe in an operative position with respect to said bar; valve means mounted on said frame for controlling the gas delivered to said blowpipe; means mounted on said frame for driving said crank arms; means mounted on said frame for controlling said driving means; said link and said crank arms being arranged so that said blowpipe will move parallel to itself in a vertical plane transversely of the bar and in an arcuate path substantially equi-distant from the surface of said bar when said crank arms are moved through arcs.

12. Blowpipe apparatus comprising, in combination, a box-like housing containing a pair of blowpipe supporting crank shafts, a rack, gear means for translating longitudinal movement of said rack to simultaneous rotary movement of said shafts, and means for longitudinally moving said rack comprising a cylinder mounted on said housing containing a piston having a rod connected to said rack, a motor-pump unit mounted on said housing and connected to said cylinder for operating said piston, and control means mounted on said housing for controlling the operation of said piston.

13. Blowpipe apparatus comprising, in combination, a box-like housing having substantially rectangular walls, a pair of parallel spaced crank shafts, bearings secured in the front and back walls of said housing in which said crank shafts are journalled, a gear keyed to each of said crank shafts within said housing, a horizontal hydraulic cylinder mounted on an end wall of said housing, rollers mounted in said housing below said gears, a horizontal rack mounted on said rollers and meshing with said gears, a piston in said cylinder having a rod connected to said rack, a blowpipe, means supporting said blowpipe including crank arms mounted on said crank shafts, a motor-pump unit mounted on said housing for operating said piston, and means for supplying gas to said blowpipe including valve means mounted on said housing.

14. Blowpipe apparatus comprising, in combination, a blowpipe; a holder for said blowpipe; and mechanism for supporting and moving said holder to move said blowpipe in a path spaced a fixed distance with respect to a work surface of any desired contour, such as arcuate or flat; said mechanism comprising a pair of crank arms swingable about parallel axes; a link connecting said arms and carrying said holder; means for adjusting the length of said link between said arms; crank blocks in which said arms are longitudinally adjustable; crank shafts on which said blocks are rotatably mounted; set screws threaded to said crank blocks and engageable with said shafts for fixing each one of said blocks against rotation on its shaft; a pair of spur gears connected to said shafts; a rack meshing with both of said gears; and means for reciprocating said rack for moving said blowpipe in said path; the arrangement being such that, by tightening both of said set screws, the length of said link may be adjusted to cause said blowpipe to move in a predetermined arcuate path, and by loosening one of said set screws, the length of said link may be adjusted to cause the nozzle end of said blowpipe to move in a flat path.

15. Blowpipe apparatus for cutting hot bars and the like, which comprises a frame adapted to be positioned in operative relation at one side of a round bar to be cut; a pair of crank arms swingable in a plane transverse to the axis of said bar about parallel axes on said frame; a link in said plane pivotally connecting said crank arms at equal distances from said parallel axes, said link having a portion extending beyond said crank arms to a position over the surface of said bar; a cutting blowpipe; and a holder for said blowpipe on said portion for supporting said blowpipe in said transverse plane and with its main axis substantially perpendicular to said link in an operative position with respect to said surface of the bar, said link and said crank arms being arranged so that said blowpipe is maintained substantially parallel to its successive positions as it moves in said transverse plane in an arcuate path substantially equidistant from said surface of the bar when said crank arms are moved through arcs.

JAMES H. BUCKNAM.
LLOYD W. YOUNG.